US008363178B2

(12) United States Patent
Chung et al.

(10) Patent No.: US 8,363,178 B2
(45) Date of Patent: Jan. 29, 2013

(54) DISPLAY DEVICE

(75) Inventors: In Jae Chung, Gyeonggi-do (KR); Ho Young Jeong, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 547 days.

(21) Appl. No.: 11/987,534

(22) Filed: Nov. 30, 2007

(65) Prior Publication Data

US 2008/0201999 A1 Aug. 28, 2008

(30) Foreign Application Priority Data

Feb. 28, 2007 (KR) ........................ 10-2007-0020069

(51) Int. Cl.
*G02F 1/1333* (2006.01)

(52) U.S. Cl. ........................................... 349/58; 349/62

(58) Field of Classification Search .................... 349/58, 349/16, 61
See application file for complete search history.

(56) References Cited

U.S. PATENT DOCUMENTS

| | | | | |
|---|---|---|---|---|
| 5,936,600 | A * | 8/1999 | Ohashi et al. | 345/87 |
| 6,532,152 | B1 * | 3/2003 | White et al. | 361/692 |
| 6,798,467 | B2 * | 9/2004 | Tasaki et al. | 349/58 |
| 6,806,922 | B2 * | 10/2004 | Ishitaka | 349/62 |
| 7,110,062 | B1 * | 9/2006 | Whitted et al. | 349/68 |
| 7,466,379 | B2 * | 12/2008 | Sakata et al. | 349/58 |
| 7,573,550 | B2 * | 8/2009 | Lubart et al. | 349/113 |
| 7,586,479 | B2 * | 9/2009 | Park et al. | 345/102 |
| 7,874,715 | B2 * | 1/2011 | Baek et al. | 362/612 |
| 2003/0017856 | A1 * | 1/2003 | Kotchick et al. | 455/566 |
| 2004/0223092 | A1 * | 11/2004 | Wu et al. | 349/58 |
| 2005/0024890 | A1 * | 2/2005 | Yamamoto et al. | 362/555 |
| 2005/0105021 | A1 * | 5/2005 | Lee et al. | 349/113 |
| 2006/0158579 | A1 * | 7/2006 | Hasegawa | 349/58 |
| 2008/0030661 | A1 * | 2/2008 | Tung et al. | 349/114 |

FOREIGN PATENT DOCUMENTS

| | | | |
|---|---|---|---|
| CN | 1537253 | A | 10/2004 |
| CN | 1722215 | A | 1/2006 |
| JP | 2000-338488 | A | 8/2000 |

* cited by examiner

*Primary Examiner* — Richard Kim
(74) *Attorney, Agent, or Firm* — Morgan, Lewis & Bockius LLP

(57) ABSTRACT

Provided is a display device that does not require a backlight unit coupled to a display panel. The display device displays an image using natural light by disposing a display panel on the window. An auxiliary light source can be disposed to complement a change of the natural light. The display device can further include a sensor for sensing a change of the natural light, and a controller for controlling the auxiliary light source in response to a signal sensed by the sensor to obtain constant brightness set to the display panel. Therefore, since the display device does not require a backlight unit and a driving circuit unit for driving the backlight unit, the display device has reduced power consumption, a slim and lightweight profile, and a simple structure. Also, the display device complements a change of the natural light using the auxiliary light source to obtain constant light intensity, so that image quality of the display panel can be enhanced.

20 Claims, 12 Drawing Sheets

DISPLAY DEVICE

This application claims the benefit of Korean Patent Application No. 10-2007-0020069 filed in Korea on Feb. 28, 2007, which is hereby incorporated by reference in its entirety.

BACKGROUND

The present invention relates to a display device not having a backlight unit.

As information-oriented society develops, various flat display devices such as liquid crystal display (LCD) device, plasma display panel (PDPs), electro luminescence display, and vacuum fluorescent display (VFDs) are under study and development.

Among these flat display devices, a display device displays an image using liquid crystals (LCs). Since the display device has a slim profile, low power consumption, a low driving voltage, and is lightweight, it is widely used.

The LCD device has a structure where LCs are interposed between two substrates. The LCD device displays an image using LCs controlled by a voltage applied between the two substrates. Since the LCD device does not emit light spontaneously, it needs a backlight unit for illuminating light from an outside. However, the backlight unit has a limitation of consuming high power.

Furthermore, recently, as demands for large-sized LCD devices increases, a substrate size and a backlight unit are also large-sized.

To meet requirement of a large-sized backlight unit, the length of a lamp increases, so that a lighting time is delayed and power consumption increases due to the increase of the length of the lamp.

Therefore, burden associated with an increase in research and development costs for a large-sized backlight unit increases. Even when huge research and development costs are invested, it is difficult to overcome technical limitations in manufacturing a backlight unit.

SUMMARY

Accordingly, the present invention is directed to a display device that substantially obviates one or more of the problems due to limitations and disadvantages of the related art.

Embodiments provide a display device that does not require a backlight unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one embodiment, a display device includes: a window for transmitting first light generated from a natural light source; and a display panel on one side of the window, the display panel including: a first substrate contacting the window; a second substrate attached onto the first substrate; a display element on the first substrate; and a frame for enclosing edges of the first and second substrates, the display panel displaying an image using the first light instead of a backlight unit for generating light.

In another embodiment, a display device includes: a window for transmitting first light generated from a first light source; a display panel on one side of the window; a second light source disposed in a vicinity of the window to generate second light; at least one sensor for sensing the first and second light; and a controller for controlling the second light source in response to a signal sensed by the sensor.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE EMBODIMENTS

Reference will now be made in detail to the embodiments of the present invention, examples of which are illustrated in the accompanying drawings.

Figure 1:
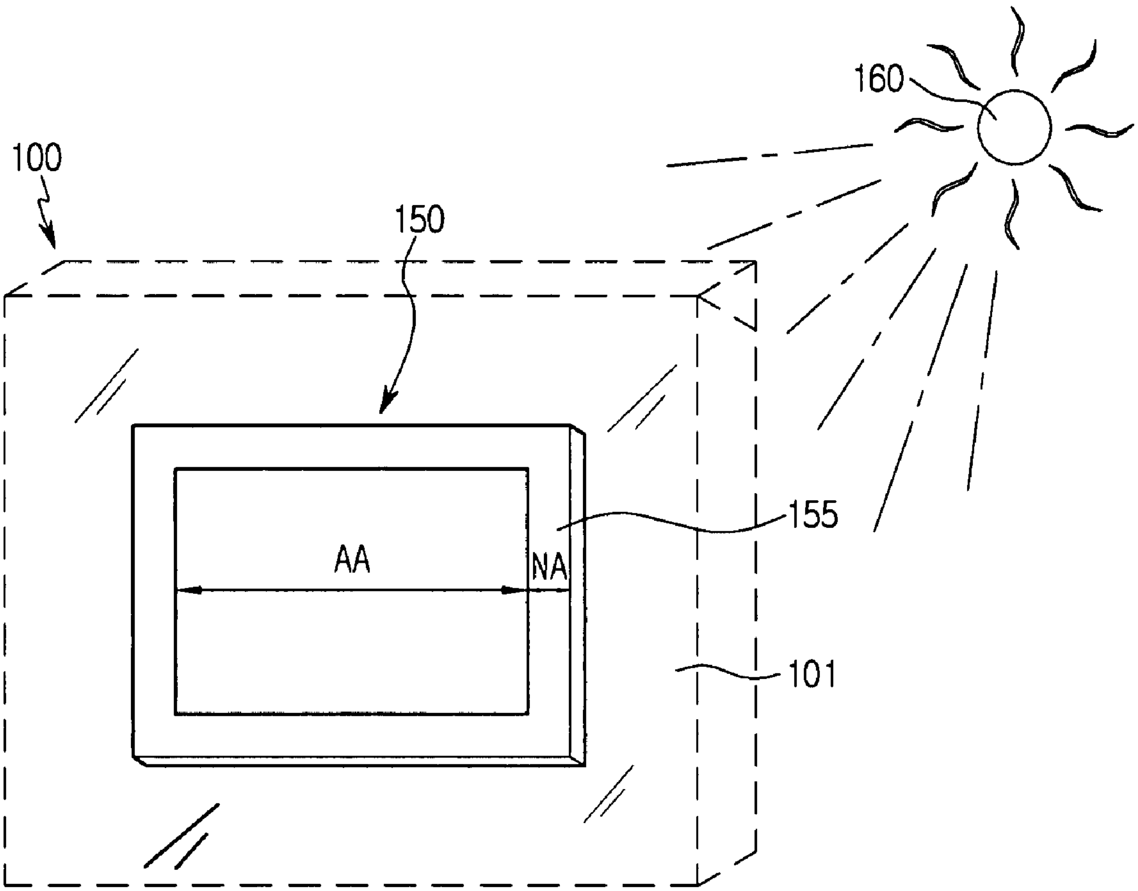
FIG. 1 is a schematic perspective view of a display device according to an embodiment.

FIG. 1 is a schematic perspective view of a display device according to an embodiment.

Referring to FIG. 1, the display device 100 includes a window 101, and a display panel 150 disposed on one side of the window 101.

The display panel 150 includes a first substrate contacting one side of the window 101, a second substrate attached on the first substrate, an LC layer interposed between the first and second substrates, and a frame 155 enclosing the edges of the first and second substrates.

The term ‘window’ has meanings described below.

The ‘window’ can be classified into various types depending on a purpose, a shape, and a location. Generally, the ‘window’ is a structure of a building installed for observing an object from one side to the other side, lighting, ventilation, and decoration of the building.

The 'window' can have an opening/closing function. Unlike this, the 'window' can be fixed in a building with a predetermined shape.

The 'window' can be installed in a ceiling surface, a wall surface, and a bottom surface of a building depending on a position.

The 'window' can be formed of various materials. The 'window' according to an embodiment can be formed of a material that can transmit light. For example, the 'window' can be formed of transparent glass or plastics.

The 'window' can have a single layer or a plurality of layers.

External light or indoor light that has passed through the window 101 can be illuminated onto the display panel 150.

The external light can be natural light such as sunlight or artificial light such as a streetlight. The indoor light can be artificial light such as illumination.

The external light and the indoor light can be used in substitution for a backlight unit that has been adopted for the display panel 150.

Therefore, the display device 100 according to an embodiment does not require a light source such as a backlight unit.

The display panel 150 displays an image using natural light or artificial light.

The display panel 150 includes an active area AA on which an image is displayed, and a non-active area NA located around the active area AA and on which an image is not displayed.

Since the display panel 150 according to an embodiment can display an image using natural light or artificial light, a related art backlight unit does not need to be provided. Therefore, since there is no power consumption caused by use of the backlight unit, maintenance costs reduce. Also, the display panel 150 according to an embodiment does not require a backlight unit and a backlight driving unit for driving the backlight unit, so that costs remarkably reduce, and the number of parts reduce, which simplifies a structure and makes the display panel 150 slim and lightweight.

Also, the display panel 150 according to an embodiment is installed in a window 101 of a building to use for various purposes.

For example, the display panel 150 can be used for the purpose of providing useful information to general public in an exhibition hall. Generally, the display panel 150 of the exhibition hall should provide an image for a long time. Since the display panel 150 does not require a backlight unit, power consumption for driving the backlight unit is not necessary, so that cost efficiency is excellent.

For example, the display panel 150 is installed in a window of a building, so that an image can be viewed in an indoor space using natural light in a day time, and can be viewed from an outside using an indoor light at night. That is, the display panel 150 can be utilized as an advertisement panel.

Recently, as the display panel 150 is large-sized, a backlight unit thereof should be large-sized. Accordingly, researches for overcoming technical limitations in manufacturing a backlight unit caused by a large size trend of a lamp, a lighting time delay of a lamp, and a power consumption increase are in active progress. According to an embodiment, even in the case where the display panel 150 is large-sized, a backlight unit does not need to develop to be suited for the large-sized display panel, so that research and development costs can be saved and a large-sized display device can be easily manufactured.

Figure 2:
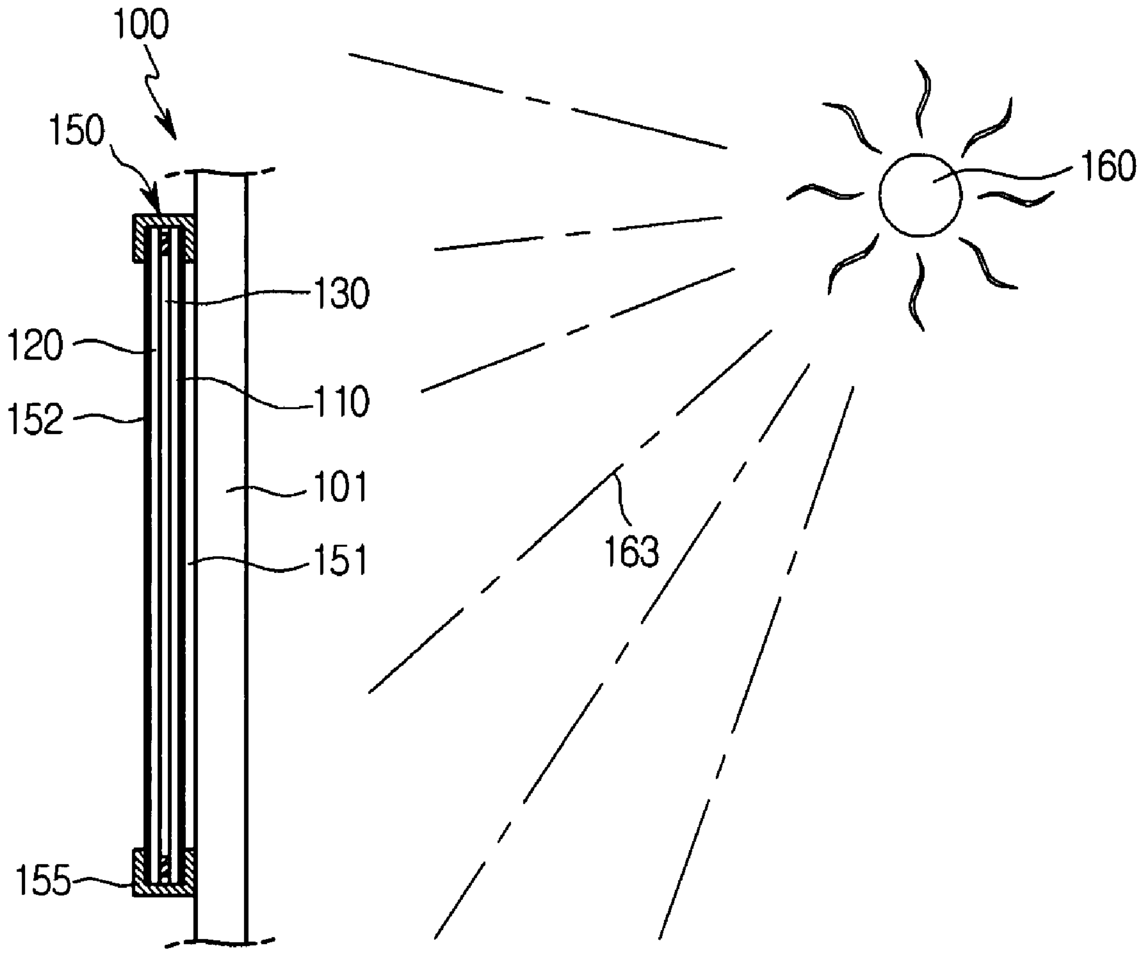
FIG. 2 is a cross-sectional view of a display device according to an embodiment.

FIG. 2 is a cross-sectional view of an display device according to an embodiment.

Referring to FIG. 2, a display device 100 according to an embodiment includes a window 101 and a display panel 150.

The display panel 150 includes a first substrate 110 contacting one side of the window 101, a second substrate 120 attached onto the first substrate 110, and an LC layer 130 interposed between the first and second substrates 110 and 120.

A first polarizing film 151 having a first polarization direction is disposed on one side of the first substrate 110.

A second polarizing film 152 having a second polarization direction is disposed on one side of the second substrate 120.

The first polarization direction and the second polarization direction can be the same, or different from each other.

The display panel 150 can further include a frame 155 for enclosing the edges of the first and second substrates 110 and 120, and the first and second polarization films 151 and 152.

The frame 155 can be disposed on a position that corresponds to a non-active area NA of the display panel 150.

The frame 155 can include a first frame and a second frame. The first and second frames are coupled to each other for solidly fixing and supporting the display panel 150.

Since the display panel 150 should be disposed on one side of the window 101, the display panel 150 can further include a first member for fixing the display panel 150 to the window 101. The first member can be provided as the frame 155 of the display panel 150. That is, the frame 155 can perform a role of the first member, simultaneously.

The window 101 can include a second member for fixing the display panel 150.

The first member and the second member can be coupled to each other. The first member and the second member may not be coupled to each other.

For example, the first member may be an adhesive member. In this case, since the first member can be directly attached onto the window 101, the second member may not be required. Also, the first member may have a 'ㄱ' shape, and the second member may have a 'ㄴ' shape. In this case, the first member can be hooked and fixed at the second member.

An optical film can be disposed between the first substrate 110 of the display panel 150 and the window 101. For example, the optical film can include at least one of a prism film, a diffusion film, and a light efficiency enhancing film.

A protective film can be disposed between the first substrate 110 of the display panel 150 and the window 101. The protective film protects the display panel 150 from external impact and foreign substances.

An optical film or a protective film can be disposed between the second substrate 120 and the frame 155.

Figure 3:
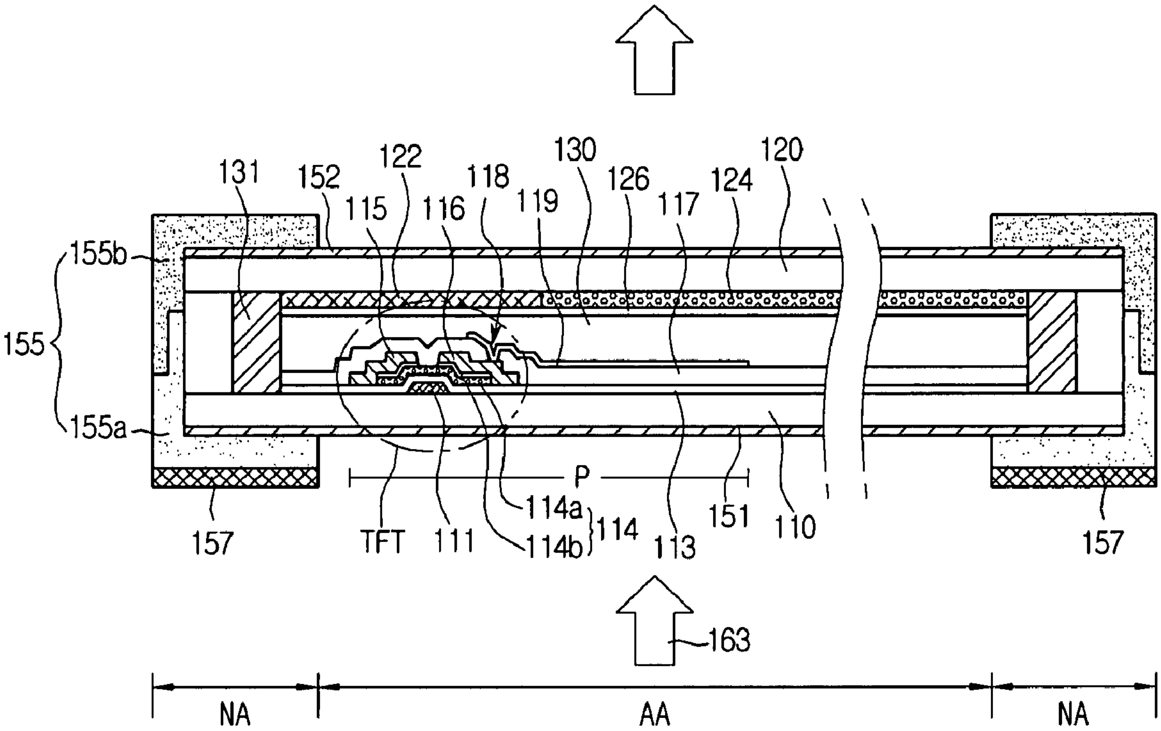
FIG. 3 is a cross-sectional view of a display panel according to a first embodiment.

FIG. 3 is a cross-sectional view of an LCD panel according to a first embodiment.

Referring to FIGS. 2 and 3, the display panel 150 includes a plurality of unit pixels P in the active area AA. FIG. 3 illustrates one representative unit pixel P.

The unit pixels P include a red pixel R, a green pixel G, and a blue pixel B.

The first substrate 110 includes a plurality of gate lines and data lines crossing each other.

The unit pixel P is defined by the crossing of the gate line and the data line.

The unit pixel P includes a thin film transistor (TFT) and a pixel electrode 119 connected to the TFT.

The TFT includes a gate electrode 111 electrically connected with the gate line, a semiconductor pattern 114 on the gate electrode 111, a gate insulating layer 113 between the semiconductor pattern 114 and the gate electrode 111, and a source electrode 115 and a drain electrode 116 separated from each other on a portion of the semiconductor pattern 114 that corresponds to the gate electrode 111. The source electrode 115 is connected to the data line, and the drain electrode 116 is connected to the pixel electrode 119.

A passivation layer 117 can be formed on an entire surface of the first substrate 110 to cover the TFT. In this case, the passivation layer 117 can further include a contact hole 118 exposing a portion of the drain electrode 116. The pixel electrode 119 is formed of a transparent conductive electrode material. The transparent conductive electrode material can be indium tin oxide (ITO) or indium zinc oxide (IZO).

The second substrate 120 facing the first substrate 110 includes red, green, and blue color filter patterns 124 corresponding to the red, green, and blue pixels, respectively.

The second substrate 120 can further include a light blocking pattern 122 formed in a region corresponding to the gate line, the data line, and the TFT.

The gate line, the data line, and the TFT substantially do not transmit light but generate light leakage at the surroundings thereof to reduce image quality. The light blocking pattern blocks light leakage. The light blocking pattern 122 can be formed of at least one of metal, a metal oxide, and an organic material. A common electrode 126 can be further formed on the entire surface of the second substrate 120.

An electric field is generated between the pixel electrode of the first substrate 110 and the common electrode 126 of the second substrate 120.

A sealant 131 is formed between a portion of the first substrate 110 corresponding to the non-active area NA, and a portion of the second substrate 120 corresponding to the non-active area NA to attach the two substrates to each other.

An LC layer 130 is interposed between the first and second substrates 110 and 120.

A first polarizing film 151 is disposed on the outer surface of the first substrate 110, and a second polarizing film 152 is disposed on the outer surface of the second substrate 120.

A first polarization direction of the first polarizing film 151 and a second polarization direction of the second polarizing film 152 can be the same or perpendicular to each other. Also, the first polarization direction and the second polarization direction can have a different direction.

LC molecules contained in the LC layer 130 change their arrangement due to an electric field generated between the pixel electrode 119 and the common electrode 126. Light transmittance of polarized light passing through the display panel 150 changes depending on the arrangement of the LC molecules.

The frame 155 enclosing the non-active area NA of the display panel 150 receives, fixes, and supports the display panel 150.

The frame 155 includes a first frame 155*a* enclosing the edge of the first substrate 110, and a second frame 155*b* enclosing the edge of the second substrate 120 and coupled to the first frame 155*a*. The first frame 155*a* includes the first polarizing film 151 and receives the first substrate 110, and the second frame 155*b* presses the second substrate 120 and is coupled to the first frame 155*a*.

The inner height of the frame 155 can be the same as the thickness of the display panel 150. The inner height of the frame 155 means a distance between the inner surface of the first frame 155*a* and the inner surface of the second frame 155*b*.

A member 157 for fixing the display panel 150 onto the window 101 can be disposed on the outer surface of the first frame 155*a* facing the window 101. For example, the member 157 can be an adhesive member. Though not shown in FIG. 3, the member 157 can be a hooking member. In this case, the window 101 can include a hooking threshold at which the hooking member can be hooked.

Light 163 illuminated onto the first substrate 110 can be natural light or artificial light illuminated through the window 101. The natural light can include light 163 from the sun 160.

Since the display panel 150 according to an embodiment is disposed on the window 101 to display an image using light illuminated onto the window 101, a backlight unit does separately not need to be provided.

Therefore, since the display panel 150 is thin and light and does not need to drive a backlight unit, power consumption can be remarkably reduced.

Also, light illuminated through the window has been a factor reducing image quality of the display panel of the related art located at the indoor space, but the display panel of the embodiment is disposed on the window to display an image using light illuminated onto the window, so that efficiency of light can be improved.

The display panel having the above-described structure is a mere embodiment of a display device according to the embodiment, the display panel according to the embodiment can be applied to all structures that can display an image using illuminated light. For example, the display panel 150 can be applied to an in plane switching (IPS) mode display device where a pixel electrode and a common electrode 126 are disposed on one substrate. Also, the display panel 150 can be applied to a transmissive display device for transmitting light illuminated in a first direction to display an image. The display panel 150 can be applied to a transflective display panel for not only transmitting first light illuminated from a first direction but also reflecting second light illuminated from a direction opposite to the first direction to display an image.

Meanwhile, a gate driving circuit unit connected to the gate lines to apply gate signals to the gate lines, and a data driving circuit unit connected to the data lines to apply data signals to the data lines can be disposed around the display panel. The gate driving circuit unit and the data driving circuit unit can be formed on the non-active area NA of the first substrate 110.

The present invention can be applied to not only the display panel but also any display panel performing the same function.

Figure 4:
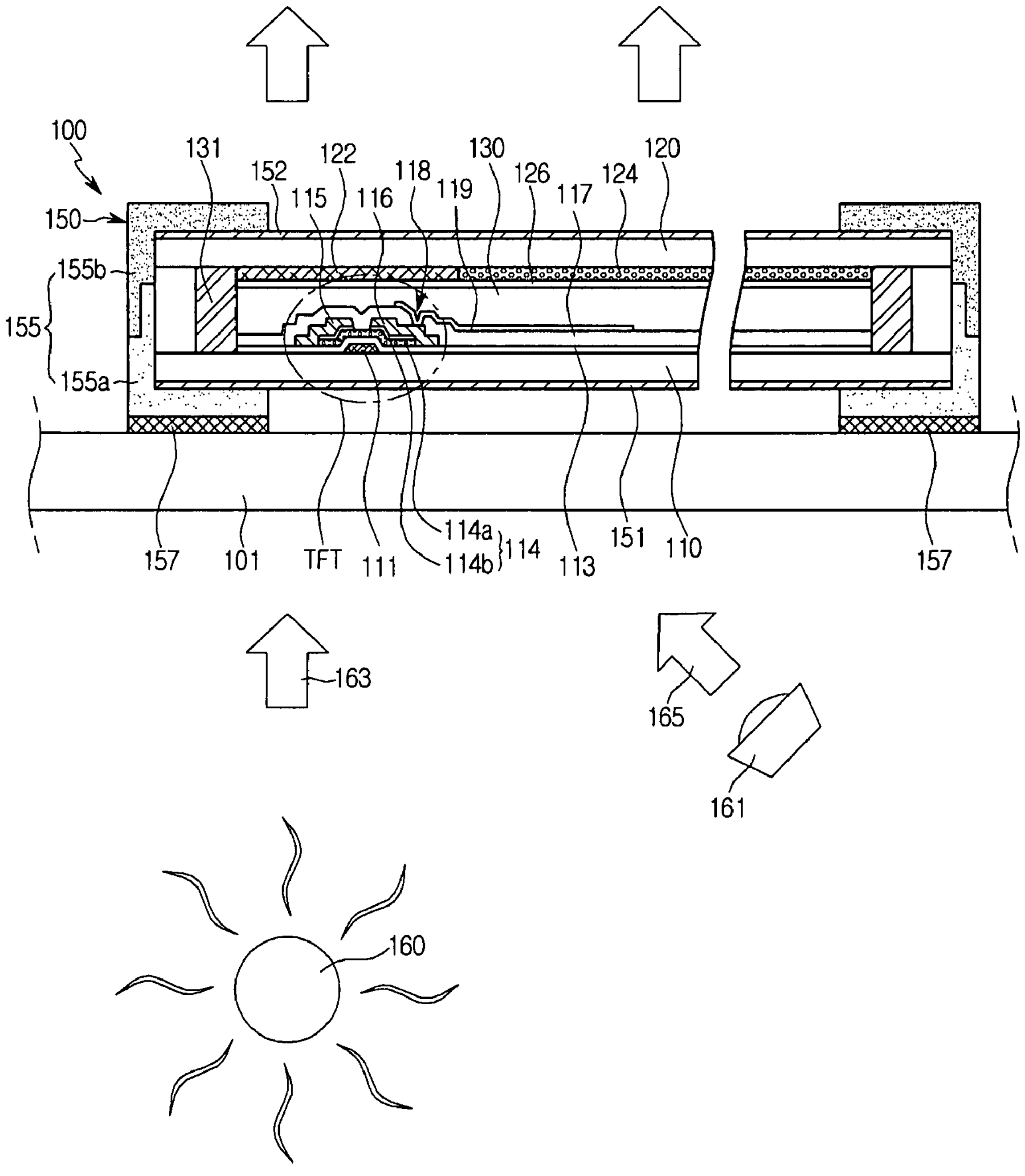
FIG. 4 is a cross-sectional view of a display device according to a second embodiment.

FIG. 4 is a cross-sectional view of a display device according to a second embodiment.

Referring to FIG. 4, a display device 100 includes a window 101, and a display panel 150 disposed on one side of the window 101 in an indoor direction.

The display device 100 can further include an auxiliary light source 161.

The auxiliary light source 161 is disposed contacting the other side of the window 101 in an outer direction. That is, the auxiliary light source 161 is can separated apart from the other side of the window 101.

The auxiliary light source 161 can be directly attached on the other side of the window 101 in the outer direction.

First light 163, which is natural light from the sun 160, passes through the window 101 and is illuminated onto the display panel 150.

Second light 165, which is artificial light generated from the auxiliary light source 161, passes through the window 101 and is illuminated onto the display panel 150.

The first light 163 and the second light 165 are illuminated onto the display panel 150 through the window 101, and the illuminated light changes its transmittance due to the LCs of the display panel 150 to display an image.

The auxiliary light source 161 can compensate for a point that light from the natural light source, for example, the light from the sun 160 may not be constant depending on time.

The natural light source, for example, the sun 160 provides different light intensity depending on time bands of dawn, the morning, the afternoon, the evening, and night. Also, the sun 160 can be shielded by a cloud, or change its light intensity every moment depending on the state of the atmosphere. Also, the sun 160 provides different light intensity even during the same time band depending on the season. Also, the sun 160 provides different light intensity even during the same time band depending on an area. Also, the sun 160 provides different light intensity illuminated onto the LC display device 100 depending on an enclosing condition of a place, for example, a building where the display device 100 is installed.

In the case where the first light 163 from the sun 160 can sufficiently display an image on the display panel 150, the second light 165 generated from the auxiliary light source 161 may not be provided to the display panel 150. That is, the auxiliary light source 161 can be lighted on or turned off by a user or systematically. In the case where the auxiliary light source 161 is turned off, any light is not generated from the auxiliary light source 161, so that no light generated from the auxiliary light source 161 is illuminated onto the display panel 150.

In the case where the first light 163 from the sun 160 cannot sufficiently display an image on the display panel 150, the second light 165 generated from the auxiliary light source 161 can be provided onto the display panel 150. In this case, the auxiliary light source 163 should be lighted on or turned off by the user or systematically.

For example, during a daytime, the display device 100 displays an image using a natural light source such as the sun 160. The image can be displayed on a side opposite to a direction in which natural light from the sun 60 is illuminated.

For example, in the night, the display device 100 displays an image using the auxiliary light source 161. The image can be displayed on a side opposite to a direction in which light generated from the auxiliary light source 161 is illuminated.

Also, in the night, the display device 100 displays an image using an artificial light source (for example, a fluorescent lamp, or an incandescent lamp) provided in an indoor space. The image is displayed in an outside, that is, on a side opposite to a direction in which the artificial light generated from the artificial light source is illuminated. In this case, an image displayed in an indoor space should be inverted and displayed.

Figure 5:
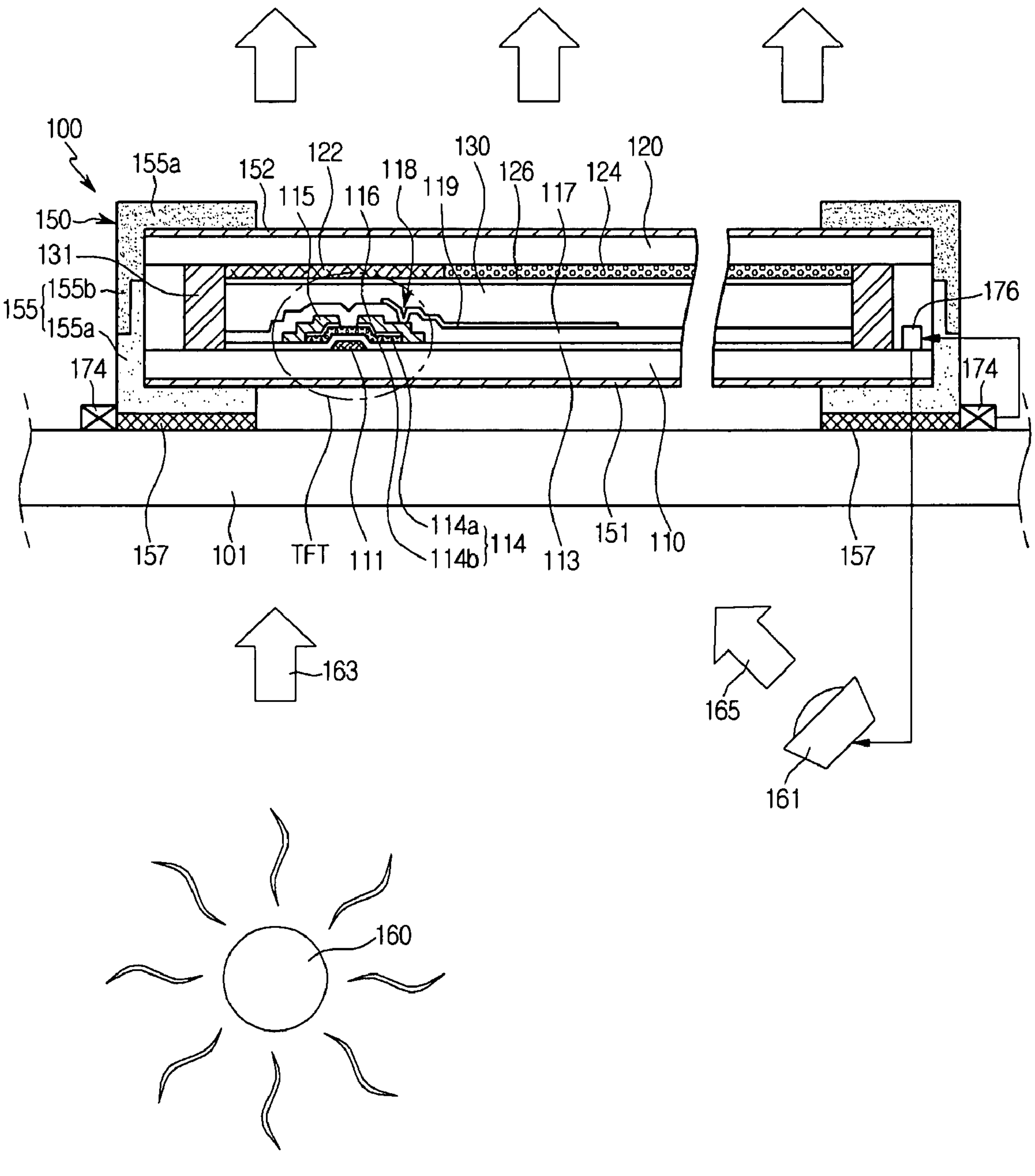
FIG. 5 is a cross-sectional view of a display device according to a third embodiment.

FIG. 5 is a cross-sectional view of a display device according to a third embodiment.

Referring to FIG. 5, the display device 100 includes a window 101 through which light from a natural light source, for example, the sun 160, and a display panel 150 disposed on one side in an indoor direction.

The display device 100 can further include an auxiliary light source 161.

The auxiliary light source 161 is disposed contacting the other side in an outdoor direction of the window 101. That is, the auxiliary light source 161 can be separated from the other side of the window 101.

The auxiliary light source 161 can be directly attached on the other side in the outdoor direction of the window 101.

The display device 100 can further include at least one sensor 174 for sensing light intensity of first light 163 that is provided from the sun 160, passes through the window 101, and is illuminated onto the display panel 150.

The sensor 174 can sense light intensity of second light 165 generated from the auxiliary light source 161.

For example, in the case where the auxiliary light source 161 is turned off at the daytime, the sensor 174 senses only the first light 163 from the sun 160. In the case where the auxiliary light source 161 is lighted on, the sensor 174 can sense both light intensity of the first light 163 from the sun 160 and light intensity of the second light 165 generated from the auxiliary light source 161.

The sensor 174 can be attached on one side of the display panel 150 to sense both the light intensity of the first light 163 and the light intensity of the second light 165.

For example, the sensor 174 can be disposed on one side or the other side of the window 101. Also, the sensor 174 can be disposed on one side portion outside a frame 155.

A controller 176 can be disposed on the outer edge of the display panel 150. The controller 176 controls the auxiliary light source 161 on the basis of the light intensities of the first and second light 163 and 165 sensed by the sensor 174. In the case where sum of the light intensities of the first and second light 163 and 165 is smaller than reference light intensity, the controller 176 increases power supplied to the auxiliary light source 161 so that the light intensities of the first and second light 163 and 165 reach the reference light intensity. The auxiliary light source 161 can generate higher light intensity using the increased power. The reference light intensity can match with brightness set to the display panel 150.

For example, in the case where the light intensity of the first light 163 from the sun 160 decreases, the sensor 174 senses the decrease in the light intensity and delivers the same to the controller 176. The controller 176 increases power supplied to the auxiliary light source 161 to increase light intensity of the second light 165 generated from the auxiliary light source 161 even more.

Therefore, the sensor 174 and the controller 176 allow sum of the first and second light 163 and 165 to always reach the reference light intensity, that is, the brightness set to the display panel 150, so that image quality of the display device 100 can be enhanced.

The sensor 174 may be operated or may not be operated by a user or systematically.

As described above, the auxiliary light source 161 can complement image quality reduction of the display panel 150 caused by change of illumination of the natural light source, for example, the sun depending on time. That is, the sensor 174 senses sum of the light intensities of the first and second light 163 and 165, and the controller 176 controls the light intensity of the second light 165, so that the brightness set to the display panel 150 can be obtained.

Figure 6:
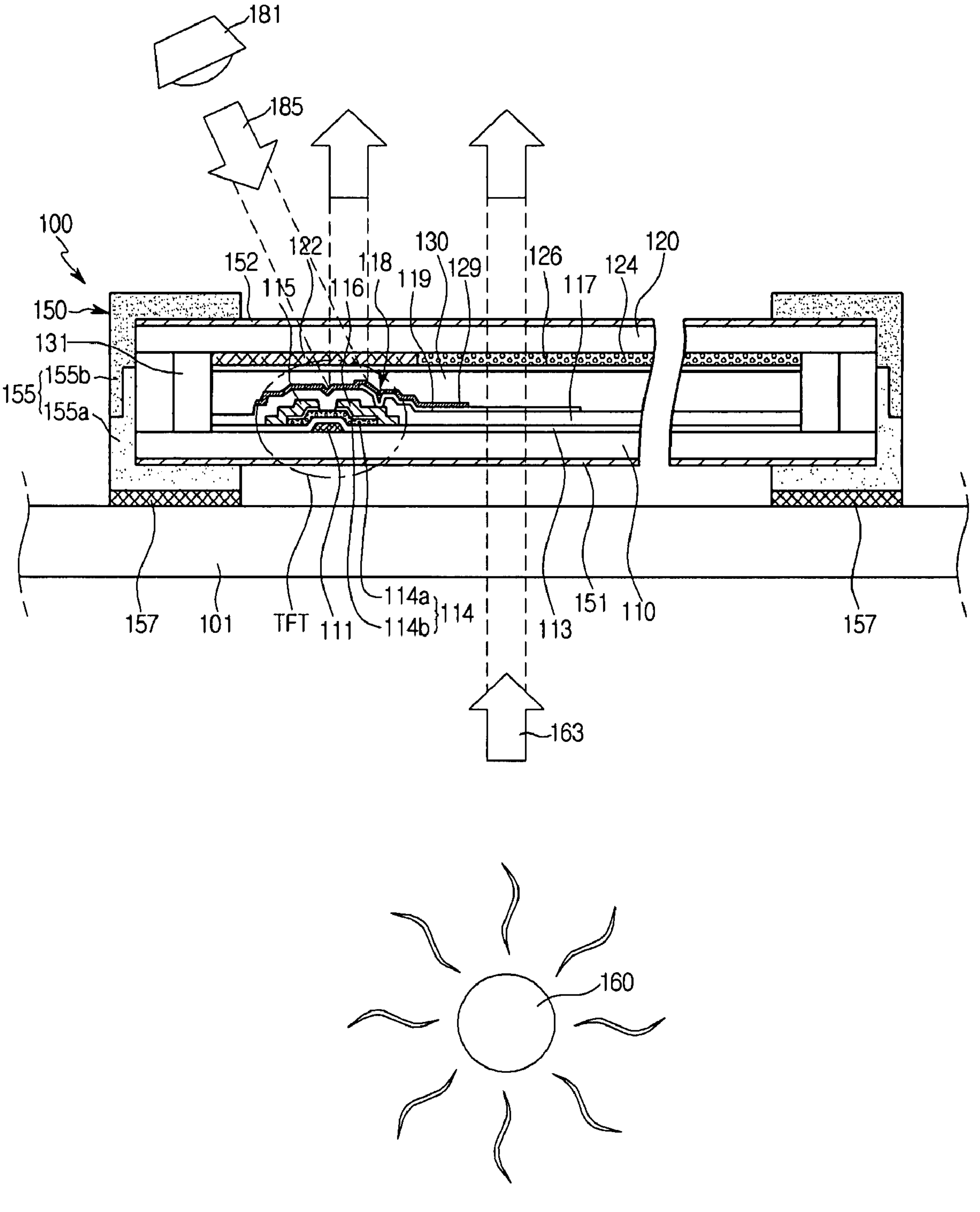
FIG. 6 is a cross-sectional view of a display device according to a fourth embodiment.

FIG. 6 is a cross-sectional view of a display device according to a fourth embodiment.

The embodiment of FIG. 6 will refer to the descriptions of the previous embodiments.

Referring to FIG. 6, the display device 100 includes a window 101, and a display panel 150 disposed on one side of the window 101 in an indoor direction.

The display device 100 can further include an auxiliary light source 181, which is an artificial light source.

Therefore, the first light 163 from the sun 160 in the outer direction of the window 101 passes through the window 101 and is illuminated onto the display panel 150. The second light 185 generated from the auxiliary light source 181 in the indoor direction of the window 101 is illuminated onto the display panel 150.

The window 101, the display panel 150, and the auxiliary light source 181 are sequentially disposed, and a natural light source such as the sun 160 can be located outside the window 101.

The fourth embodiment is similar to the second embodiment except that the auxiliary light source 181 is disposed in an indoor space of the window 101.

A reflection area including a reflective electrode 129 can be formed in an active area AA of the display panel 150.

The active area AA of the display panel 150 includes a plurality of unit pixels P.

The plurality of unit pixels P are defined by crossing of gate lines and data lines. The unit pixel P includes the gate line, a TFT connected to the data line, and a pixel electrode 119 electrically connected to the TFT. Also, the reflective electrode 129 is formed in a portion of the unit pixel P. The pixel electrode 119 is formed of a transparent conductive electrode material, and the reflective electrode 129 is formed of opaque metal. The reflective electrode 129 can reflect the first light 163 from the sun 160 or the second light 185 generated from the auxiliary light source 181.

Figure 7:
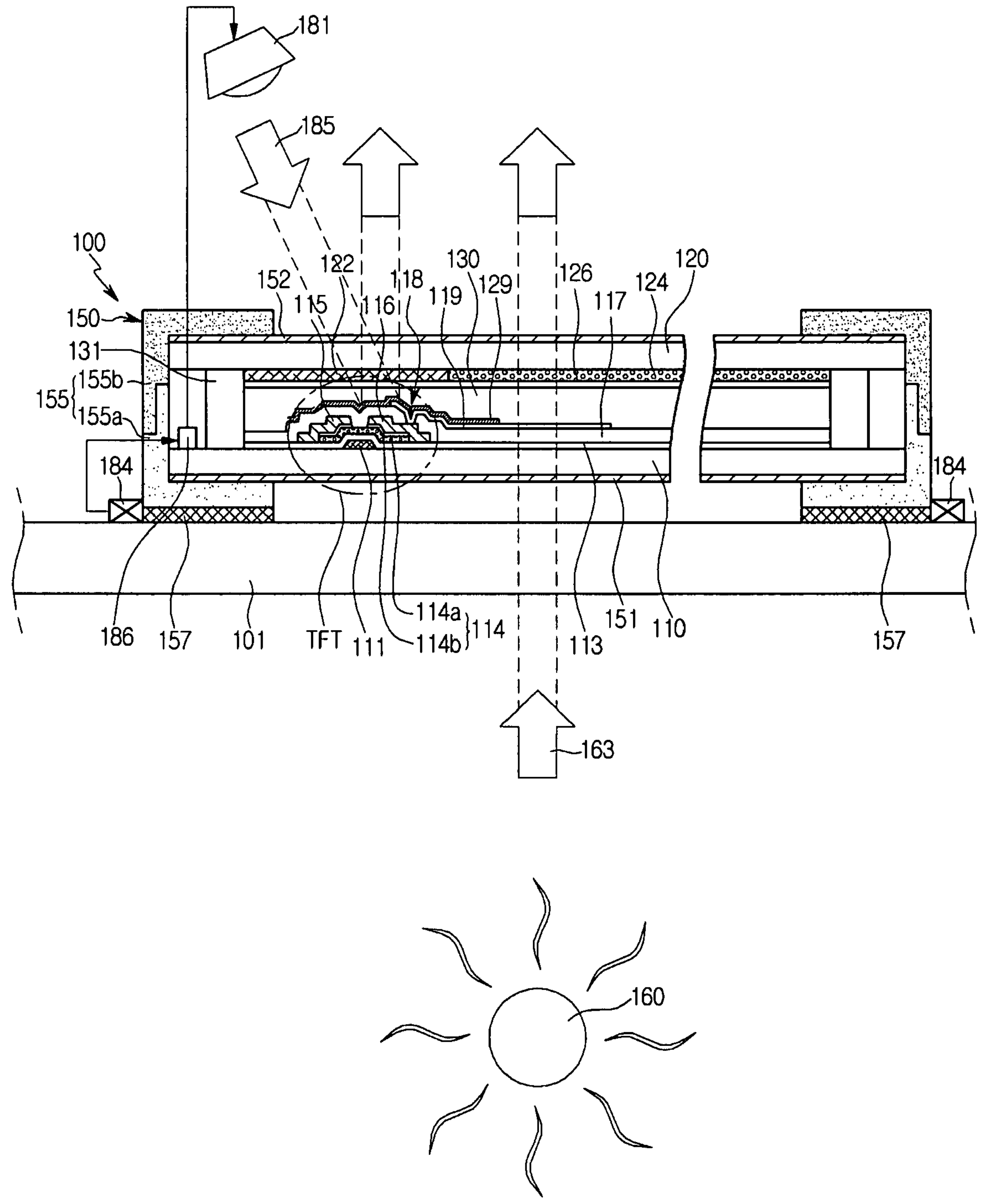
FIG. 7 is a cross-sectional view of a display device according to a fifth embodiment.

FIG. 7 is a cross-sectional view of a display device according to a fifth embodiment.

The fifth embodiment is similar to the fourth embodiment. That is, the fifth embodiment further includes a sensor 184 and a controller 186 in addition to the fourth embodiment to control the light intensity of the auxiliary light source 181, so that brightness set to the display panel 150 can be obtained.

Referring to FIG. 7, the display device 100 includes a window 101, and a display panel 150 disposed on one side of the window 101.

The display device 100 can further include an auxiliary light source 181, which is an artificial light source.

Therefore, first light 163 from the sun 160 in the outer direction of the window 101 passes through the window 101 and is illuminated onto the display panel 150. Second light 185 generated from the auxiliary light source 181 in an indoor direction of the window is illuminated onto the display panel 150.

The auxiliary light source 181 is disposed above the other side of the window 101. That is, the auxiliary light source 181 can be separated from the other side of the window 101.

The auxiliary light source 181 can be directly attached on the other side of the window 101 in the outer direction of the window 101.

The display device 100 can further include at least one sensor 184 for sensing light intensity of first light 163 that is provided from the sun 160, passes through the window 101, and is illuminated onto the display panel 150.

The sensor 184 can sense light intensity of second light 185 generated from the auxiliary light source 181.

For example, in the case where the auxiliary light source 181 is turned off at the daytime, the sensor 184 senses only the first light 163 from the sun 160. In the case where the auxiliary light source 181 is lighted on, the sensor 184 can sense both light intensity of the first light 163 from the sun 160 and light intensity of the second light 185 generated from the auxiliary light source 181.

The sensor 184 can be attached on one side of the display panel 150 to sense both the light intensity of the first light 163 and the light intensity of the second light 185.

For example, the sensor 184 can be disposed on one side or the other side of the window 101. Also, the sensor 184 can be disposed on one side of the display panel 150.

A controller 186 can be disposed on the outer edge of the display panel 150. The controller 186 controls the auxiliary light source 181 on the basis of the light intensities of the first and second light 163 and 185 sensed by the sensor 184. In the case where sum of the light intensities of the first and second light 163 and 185 is smaller than reference light intensity, the controller 176 increases power supplied to the auxiliary light source 181 so that the light intensities of the first and second light 163 and 185 reach the reference light intensity. The auxiliary light source 181 can generate higher light intensity using the increased power. The reference light intensity can match with brightness set to the display panel 150.

For example, in the case where the light intensity of the first light 163 from the sun 160 decreases, the sensor 184 senses the decrease in the light intensity and delivers the same to the controller 186. The controller 186 increases power supplied to the auxiliary light source 181 to increase light intensity of the second light 185 generated from the auxiliary light source 181 even more.

Therefore, the sensor 184 and the controller 186 allow sum of the first and second light 163 and 185 to always reach the reference light intensity, that is, the brightness set to the display panel 150, so that image quality of the display device 100 can be enhanced.

The sensor 184 may be operated or may not be operated by a user or systematically.

As described above, the auxiliary light source 181 can complement image quality reduction of the display panel 150 caused by change of illumination of the natural light source, for example, the sun depending on time. That is, the sensor 184 senses sum of the light intensities of the first and second light 163 and 185, and the controller 186 controls the light intensity of the second light 185, so that the brightness set to the display panel 150 can be obtained.

The first light 163 is illuminated onto the display panel 150 through the window 101, and the second light 185 is directly illuminated onto the display panel 150. The first light 163 passes through the display panel 150, and the second light 185 is illuminated onto the display panel 150, and reflected by a reflective electrode 129, so that light transmittance changes to display an image.

Figure 8:
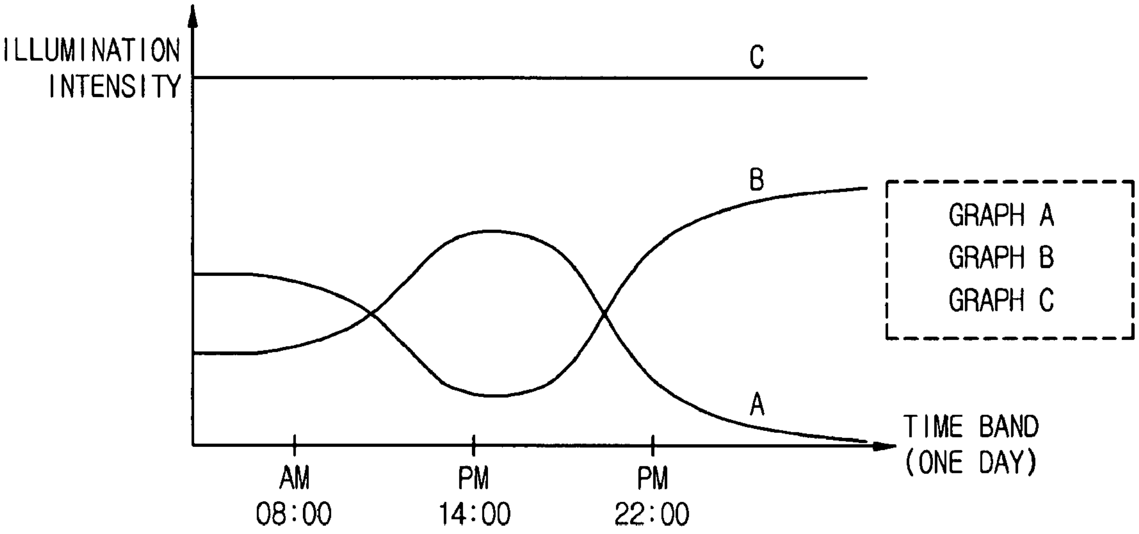
FIG. 8 is a graph illustrating light intensity from an auxiliary light source is controlled to maintain light intensity illuminated onto a display panel constant in embodiments.

FIG. 8 is a graph illustrating light intensity from an auxiliary light source is controlled to maintain light intensity illuminated onto a display panel constant in the embodiments.

Referring to FIG. 8, the auxiliary light source 181 complements a characteristic that illumination intensity of the natural light source, for example, the sun 160 may not be constant depending on time to allow light intensity illuminated onto the display panel 150 to be constant regardless of illumination intensity of the sun 160.

X-axis represents a time band of one day, and Y-axis represents illumination intensity depending on the time band of X-axis, that is, light intensity illuminated onto the display panel 150.

A curve A is the light intensity of a natural light source, a curve B is the light intensity of an auxiliary light source, and a curve C is sum of the light intensities of the natural light source and the auxiliary light source.

The natural light source, for example, the sun 160 illuminated onto the display panel 150 through the window 101 provides different light intensity depending on time bands of dawn, the morning, the afternoon, the evening, and night. Also, the sun 160 can be shielded by a cloud, or change its light intensity every moment depending on the state of the atmosphere. Also, the sun 160 provides different light intensity even during the same time band depending on the season. Also, the sun 160 provides different light intensity even during the same time band depending on an area. Also, the sun 160 provides different light intensity illuminated onto the LC display device 100 depending on a enclosing condition of a place, for example, a building where the display device 100 is installed.

As illustrated in FIG. 8, in the case where the light intensity of the natural light source decreases, the light intensity of the auxiliary light source increases. In the case where the light intensity of the natural light source increases, the light intensity of the auxiliary light source decreases. Accordingly, the light intensity of the natural light source and the light intensity of the auxiliary light source are controlled to constant light intensity so that brightness set to the display panel is obtained.

The auxiliary light source 181 can be controlled by a user or systematically.

Referring to the curve A, the natural light source gradually increases in its light intensity between the time band of the morning, for example about 8:00, and the time band of the afternoon, for example about 14:00. Also, the natural light source drastically falls down in its light intensity between the time band of the afternoon, for example about 14:00, and the time band of the evening, for example about 22:00. Therefore, the light intensity of the first light illuminated onto the display panel changes according to the curve A for one day.

Referring to the curve B, as the light intensity of the natural light source increases or decreases, the light intensity of the auxiliary light source decreases or increases. Consequently, sum of the light intensity of the natural light source and the light intensity of the auxiliary light source is made constant (refer to a curve C). Therefore, the auxiliary light source can complement a change in the light intensity of the natural light source to provide light intensity for always obtaining brightness set to the display panel.

Figure 9A:
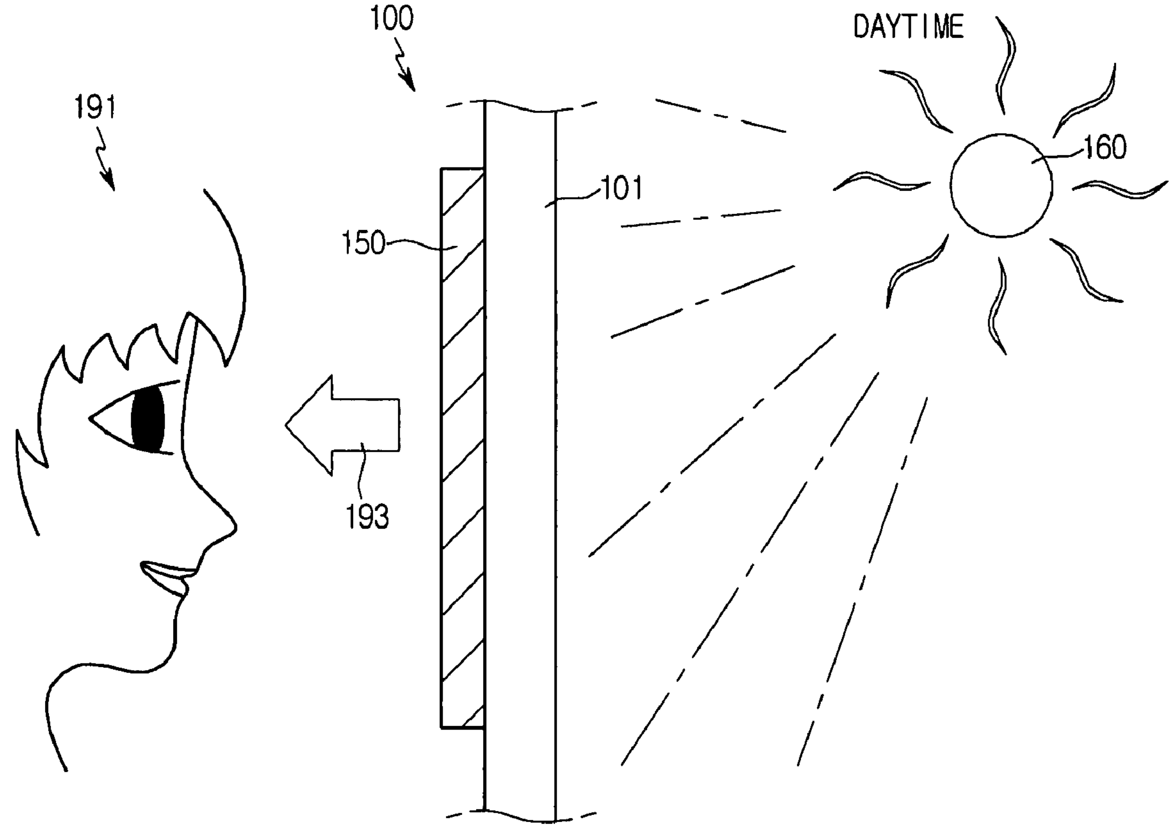
FIG. 9A is a schematic cross-sectional view illustrating an example of a utilizing method of a display device according to an embodiment depending on use environment.
Figure 9B:
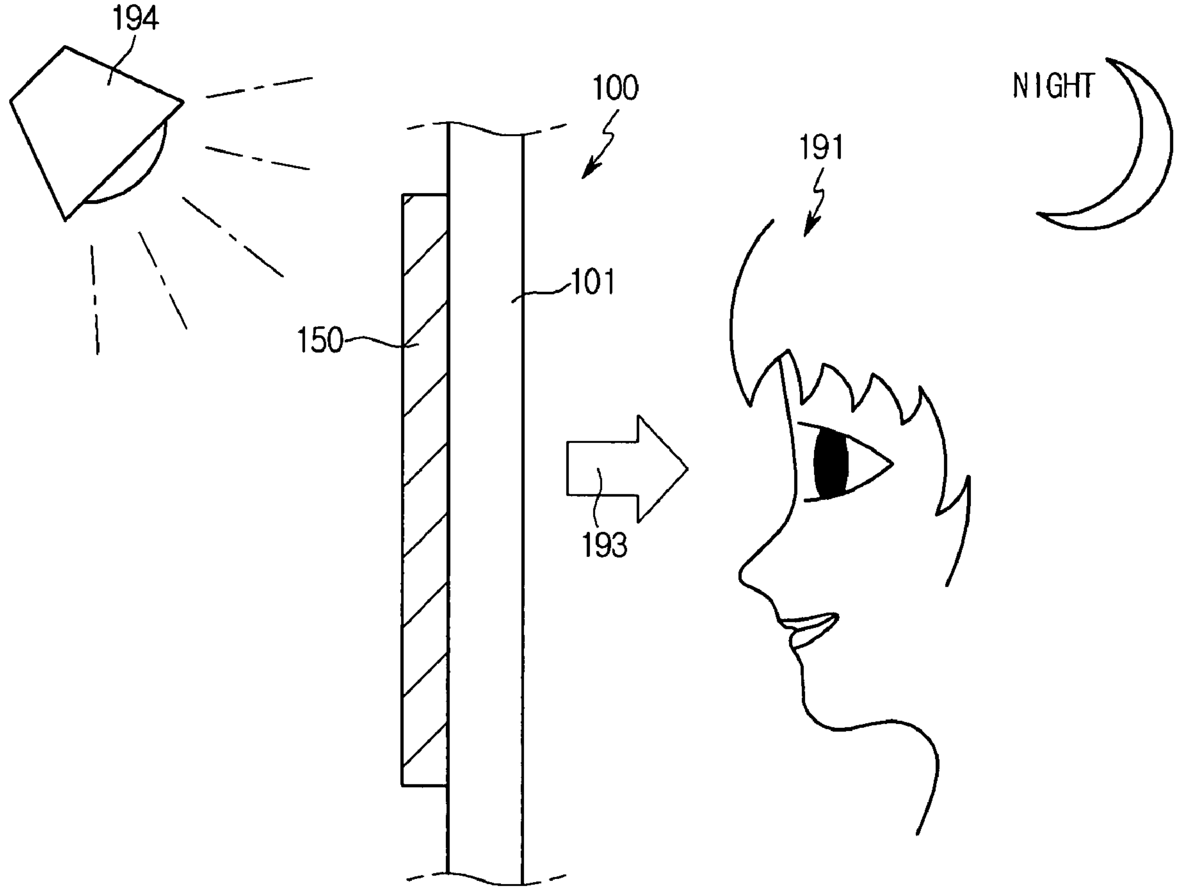
FIG. 9B is a schematic cross-sectional view illustrating another example of a utilizing method of a display device according to an embodiment depending on use environment.

FIGS. 9A and 9B are schematic cross-sectional views illustrating an example of a utilizing method of a display device according to embodiments depending on use environment.

FIG. 9A illustrated a display device 100 is viewed in an indoor space in the case where light intensity is sufficient as in the daytime.

Here, the display device 100 uses the sun 160 as a light source. The display device 100 receives light from the sun 160 to provide an image 193 to a user 191.

FIG. 9B illustrates a display device 100 is viewed in an outdoor space in the case where few light intensity is provided as in the night.

Here, the display device 100 uses an indoor light source or an auxiliary light source as a light source 194. The display device 100 receives light from the indoor light source or the auxiliary light source, which is an artificial light source to provide an image 193 to a user 191.

For example, during the daytime, the display device 100 displays an image 193 using outside light. At this point, the image 193 can be viewed in an indoor space, i.e., in an opposite direction to a direction in which the outside light is illuminated.

In the night, the display device 100 displays the image 193 using light generated from an artificial light source 194 used in an indoor space. At this point, the image 193 can be viewed in an outdoor space, i.e., in an opposite direction to a direction in which light generated from the artificial light source 194 is illuminated. The image 193 that has been viewed in the indoor space can be inverted and displayed.

Meanwhile, in the night, the display device 100 can display the image 193 using the artificial light source 194 installed in the outdoor space. That is, the image can be viewed also in the indoor space.

Figure 10:
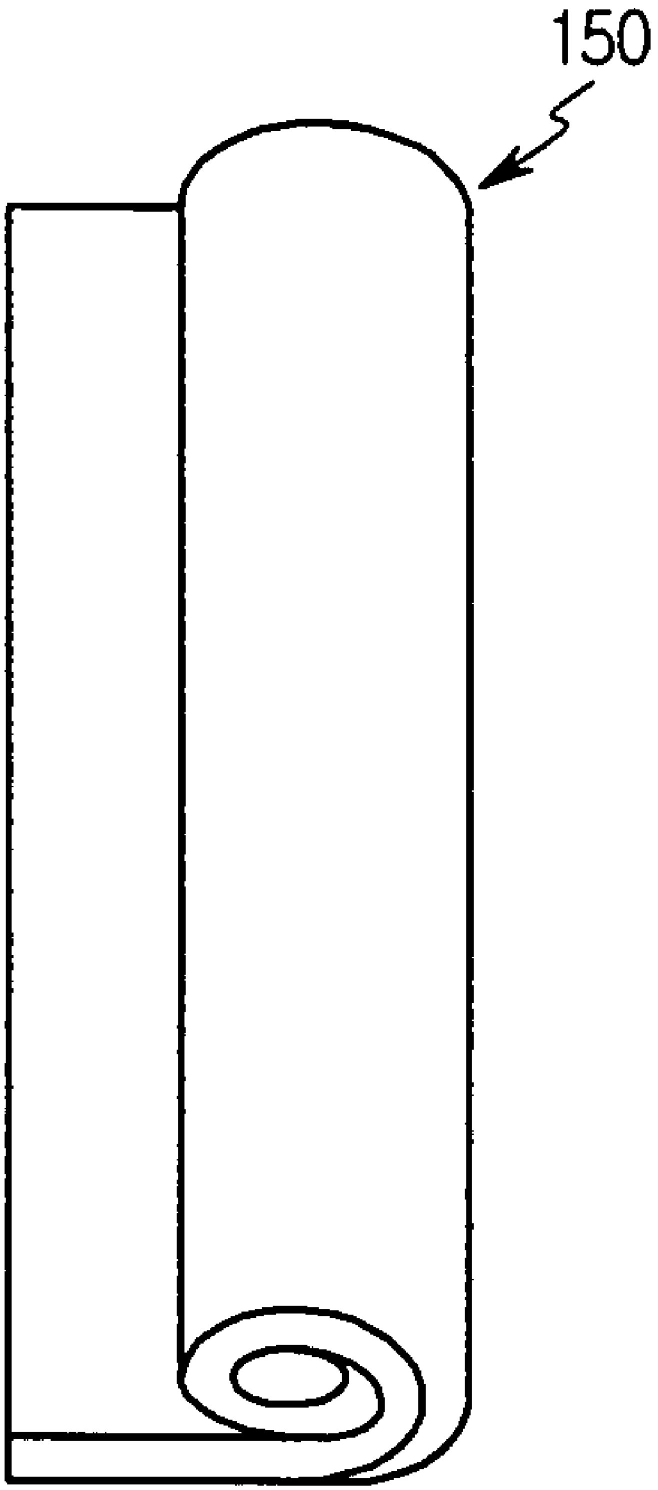
FIG. 10 is a conceptual view illustrating a flexible display panel in embodiments.

FIG. 10 is a conceptual view illustrating a flexible display panel in embodiments.

The display panel 150 is disposed on one side of the window 101 in the above-described embodiments and embodiments that can be provided by the present invention.

The display panel 150 includes a first substrate 110, a second substrate 120, and an LC layer 130 between the first and second substrates 110 and 120.

The first substrate 110 and/or the second substrates 120 can be a flexible substrate. Therefore, the display panel 150 can be used as a flexible display panel.

The flexible display panel can be folded and stored, or moved, and is convenient to carry. Also, the flexible display panel is not only lightweight but also slim, so that it is easy to attach onto the window and has excellent stability and a decorative effect.

Therefore, the display device can be folded and stored while it is attached on the window when it is not in use. Also, the flexible display panel can be unfolded again and used as the display device when it is to be used.

Therefore, in the case where the display panel of the display device is manufactured in the form of the flexible display panel, not only an aesthetic aspect can be satisfied but also a practical aspect is excellent.

Figure 11:
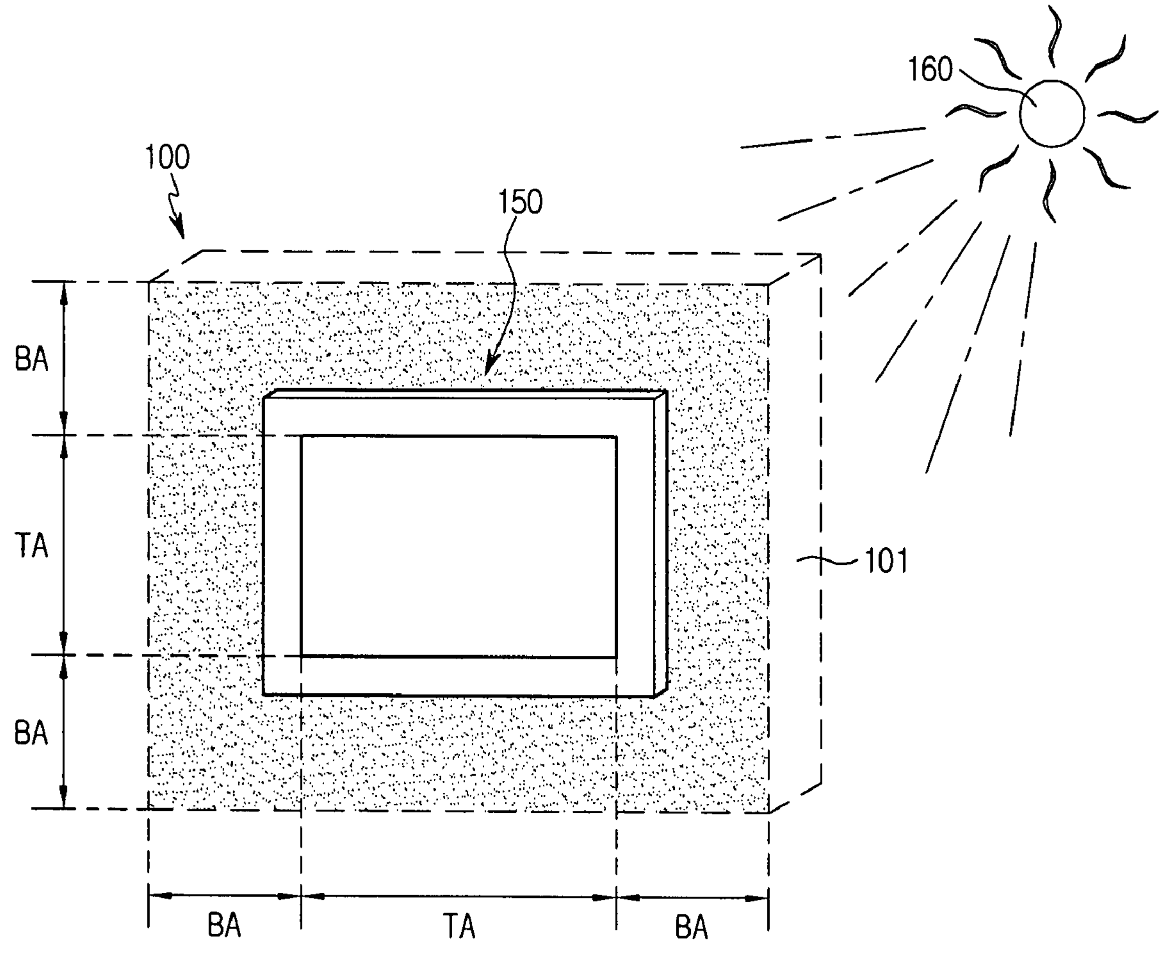
FIG. 11 is a schematic perspective view of a display device according to a sixth embodiment.

FIG. 11 is a schematic perspective view of a display device according to a sixth embodiment.

Referring to FIG. 11, a window 101 includes a transmission area TA through which light passes, and a blocking area BA by which light is blocked.

The display panel 150 is disposed on the transmission area TA of the window 101 through which light passes.

The portion on which the display panel 150 is not attached is processed not to pass external light. The blocking area BA allows an image to be clearly viewed when the display panel 150 is viewed in an indoor space. A light blocking film can be disposed in the blocking area BA.

The display panel 150 disposed in the transmission area TA of the window 101 through which light passes uses an external light source, for example, the sun 160 as a light source for displaying an image. Light from the sun 160 passes through the window 101 and is illuminated onto the display panel to display an image.

The embodiment of FIG. 11 can be applied to the previous embodiments and embodiments that can be provided by the present invention.

Although embodiments have been described with reference to a number of illustrative embodiments thereof, it should be understood that numerous other modifications and embodiments can be devised by those skilled in the art that will fall within the spirit and scope of the principles of this disclosure.

Since a display panel is disposed on a window and an external light source is used as a light source in embodiments, power efficiency is excellent.

Also, since a backlight unit and a driving circuit unit for driving the backlight unit are not required, the display panel is slim and lightweight, and has a simple structure.

Also, according to an embodiment, a flexible display panel is lightweight and thus easy to attach onto a window, and stability is excellent and aesthetic aspect can be satisfied.

Also, according to an embodiment, even when a display panel is large-sized, a backlight unit thereof does not need to be developed, so that research and development costs can be saved, and a large-sized display device can be easily realized.

Furthermore, according to an embodiment, power efficiency is excellent and space is efficiently utilized, so that the present invention provides high industrial applicability.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A display device, comprising:

a window for transmitting first light generated from a natural light source, the window having a first side and a second side opposite the first side with the natural light source being disposed on a first side of the window; and a display panel disposed on one of the first side and the second side of the window, the display panel comprising:

a first substrate contacting the window;

a second substrate attached onto the first substrate;

a display element on the first substrate;

a frame for enclosing edges of the first and second substrates; and an auxiliary light source disposed in a vicinity of the window on the first side of the window to generate second light, wherein the light intensity of the auxiliary light source is controlled by user or system, wherein the display panel displays an image to viewed on a second side of the window using the first and second light, and wherein the frame includes a first frame enclosing the edge of the first substrate and a second frame enclosing the edge of the second substrate, wherein the second frame is coupled to the first frame in a side of the display panel, wherein the display panel includes means for fixing the display panel onto the window, wherein the first frame is attached to the first side of the window by the means, and wherein the window is a structure of a building installed for observing an object from one side to the other side, lighting, ventilation, and decoration of the building.

2. The display device according to claim 1, wherein the means comprises an adhesive member.

3. The display device according to claim 1, wherein the means comprises a fixing member.

4. The display device according to claim 1, wherein the means is disposed between the frame and the window.

5. The display device according to claim 1, wherein the display panel is disposed on the window in any one of an outdoor direction and an indoor direction.

6. The display device according to claim 1, wherein the auxiliary light source is disposed on a surface of the window or separated from the window.

7. The display device according to claim 1, further comprising a light blocking film on a portion of the window around the display panel.

8. The display device according to claim 1, wherein at least one of the first and second substrates comprises a flexible substrate.

9. A display device, comprising:

a window for transmitting first light generated from a natural light source, the window having a first side and a second side opposite the first side with the natural light source being disposed on a first side of the window;

a display panel disposed on one of the first side and the second side of the window;

an auxiliary light source disposed in a vicinity of the window on the first side of the window to generate second light, wherein the light intensity of the auxiliary light source is controlled by user or system;

at least one sensor for sensing the first and second light; and a controller for controlling the auxiliary light source in response to a signal sensed by the sensor, wherein the display panel displays an image to viewed on a second side of the window using the first and second, wherein the display panel includes a first substrate contacting the window, a second substrate attached onto the first substrate, a display element on the first substrate; and a frame for enclosing edges of the first and second substrates, wherein the frame includes a first frame enclosing the edge of the first substrate and a second frame enclosing the edge of the second substrate, wherein the second frame is coupled to the first frame in a side of the display panel, wherein the display panel includes means for fixing the display panel onto the window, wherein the first frame is attached to the first side of the window by the means, wherein the window is a structure of a building installed for observing an object from one side to the other side, lighting, ventilation, and decoration of the building, and wherein the sensor is disposed on one side portion of the first frame in a first side of the window.

10. The display device according to claim 9, wherein the means comprises an adhesive member.

11. The display device according to claim 9, wherein the means comprises a fixing member.

12. The display device according to claim 9, wherein the means is disposed between the frame and the window.

13. The display device according to claim 9, wherein the controller controls the auxiliary light source such that sum of light intensities of the first and second light matches with reference light intensity.

14. The display device according to claim 13, wherein the reference light intensity is light intensity for obtaining brightness set to the display panel.

15. The display device according to claim 9, wherein the display panel is disposed on the window in any one of an outdoor direction and an indoor direction.

16. The display device according to claim 9, wherein the auxiliary light source is disposed on a surface of the window or separated from the window.

17. The display device according to claim 9, further comprising a light blocking film on a portion of the window around the display panel.

18. The display device according to claim 9, wherein at least one of the first and second substrates comprises a flexible substrate.

19. The display device according to claim 9, wherein the light intensity of the auxiliary light source is controlled to be set to different brightnesses.

20. The display device according to claim 9, wherein the light intensity of the auxiliary light source is controlled so that the total light intensity illuminated onto the display panel from the natural light source and the auxiliary light source is constant.

* * * * *